July 5, 1966
R. C. WHITE
3,258,852
MATERIAL HANDLING APPARATUS
Filed April 19, 1965
4 Sheets-Sheet 1
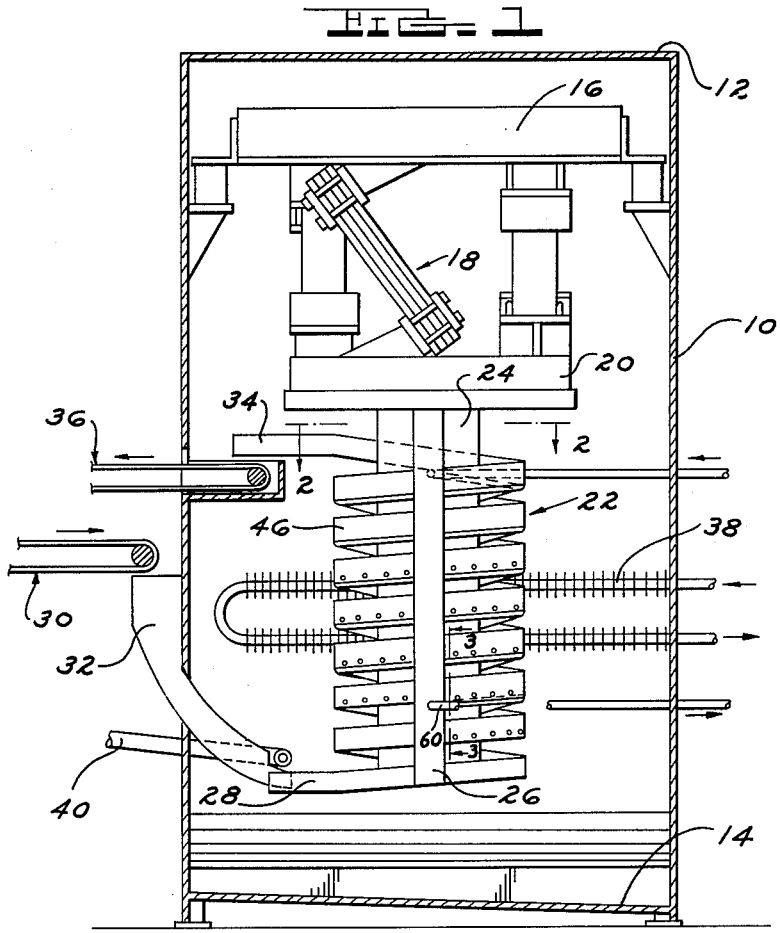
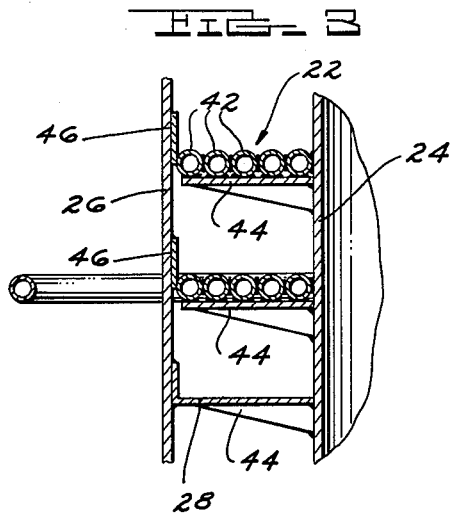
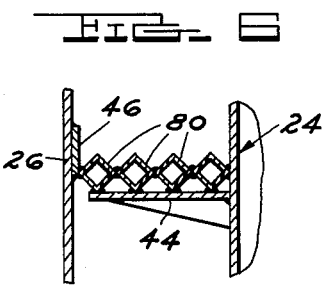
INVENTOR.
ROBERT C. WHITE
BY
Barnes, Kisselle,
Raisch & Choate
ATTORNEYS July 5, 1966  R. C. WHITE  3,258,852
MATERIAL HANDLING APPARATUS
Filed April 19, 1965  4 Sheets-Sheet 2
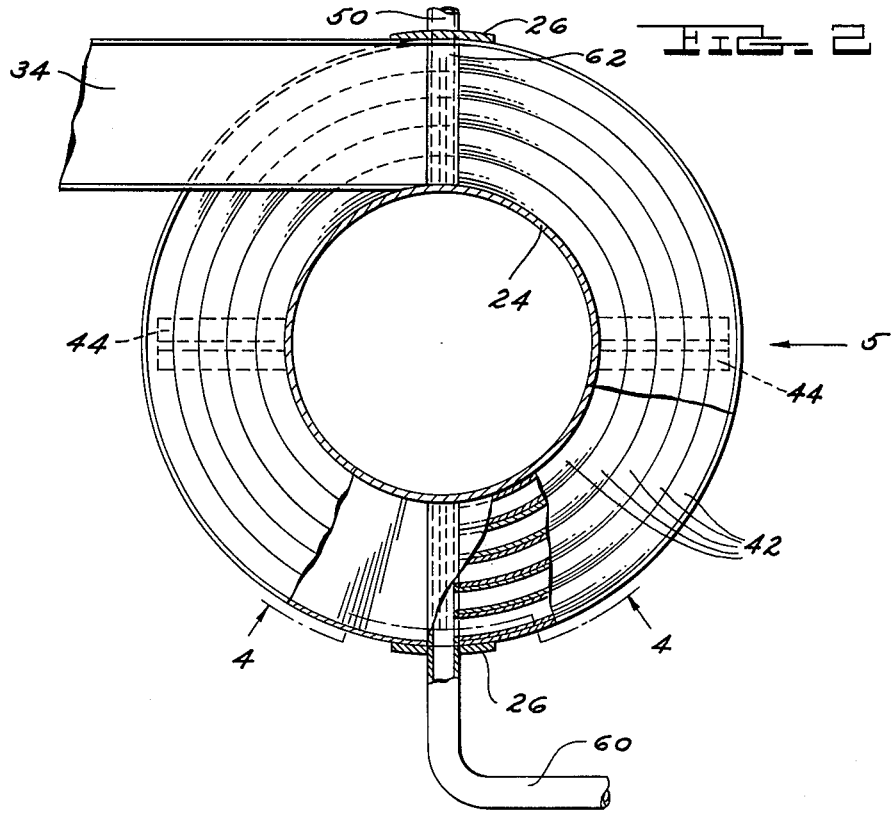
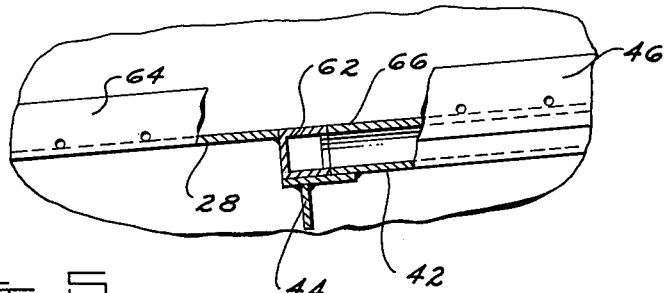
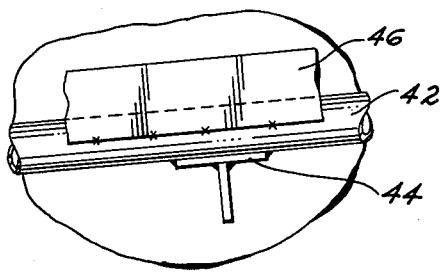
INVENTOR.
ROBERT C. WHITE
BY
Barnes, Kisselle, Raisch
& Choate
ATTORNEYS July 5, 1966  R. C. WHITE  3,258,852
MATERIAL HANDLING APPARATUS
Filed April 19, 1965  4 Sheets-Sheet 3
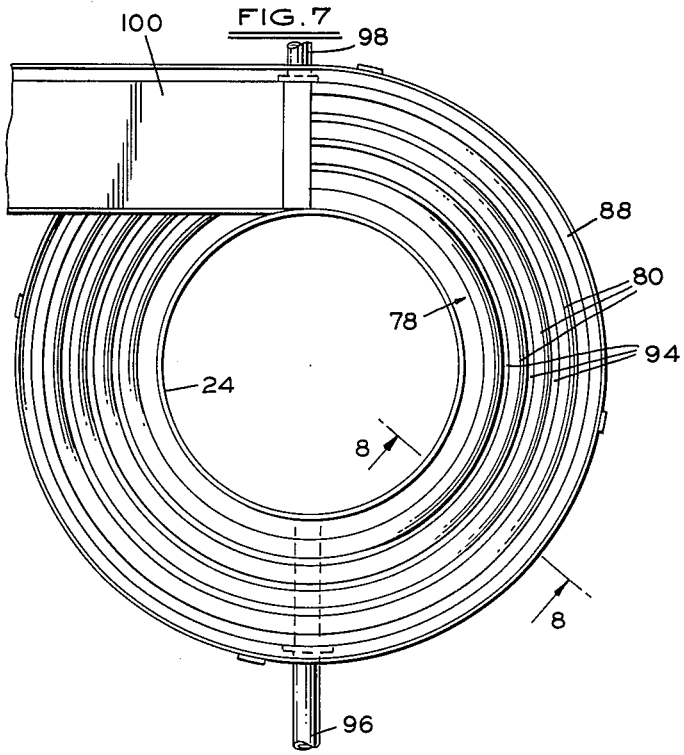
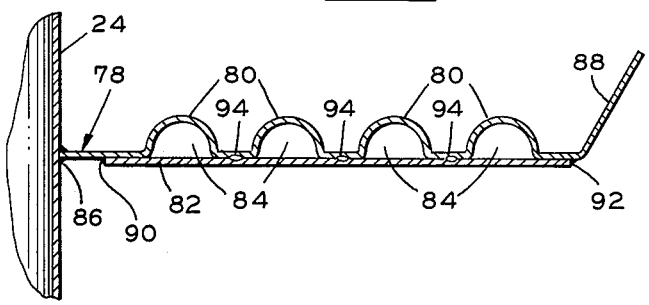
INVENTOR
ROBERT C. WHITE
BY
Barnes, Kisselle, Raisch & Choate
ATTORNEYS July 5, 1966  R. C. WHITE  3,258,852
MATERIAL HANDLING APPARATUS
Filed April 19, 1965  4 Sheets-Sheet 4
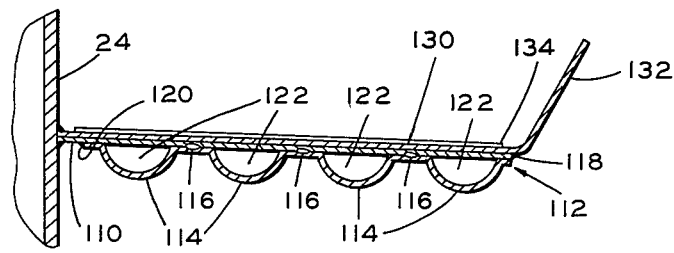
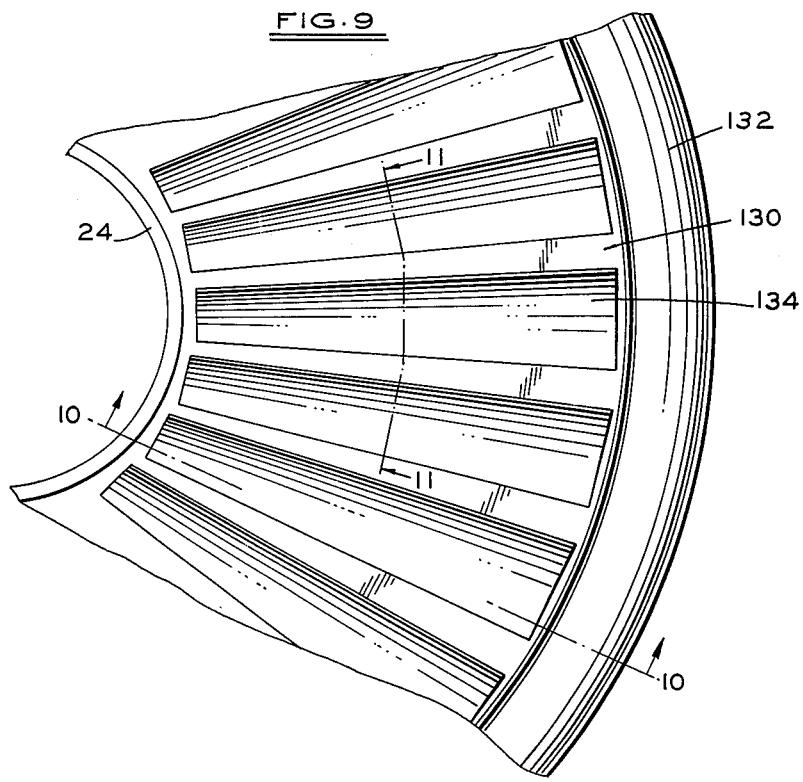
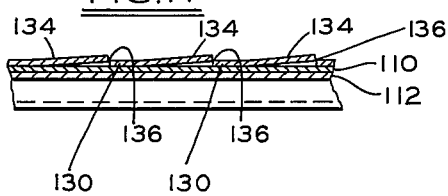
*INVENTOR*
ROBERT C. WHITE
BY
Barnes, Kisselle,
Raisch & Choate
*ATTORNEYS*

United States Patent Office 3,258,852
Patented July 5, 1966

3,258,852
MATERIAL HANDLING APPARATUS
Robert C. White, Detroit, Mich., assignor to Detrex Chemical Industries, Inc., Detroit, Mich., a corporation of Michigan
Filed Apr. 19, 1965, Ser. No. 451,681
8 Claims. (Cl. 34—164)

This application is a continuation-in-part application of Serial No. 170,051, filed January 31, 1962, now abandoned, the subject matter in FIGURES 1 to 6 of this application having been a part of the aforesaid application and the subject matter of FIGURES 7 to 11 having been added in the present application.

This invention relates to a material handling apparatus and more particularly to that type of conveying device which utilizes a helical track. The device is usually used for conveying small parts upwardly by imparting an incremental vibratory motion to the entire track.

The devices under consideration are frequently used for the treating of parts in a fluid or liquid or even a vapor to clean the parts or sometimes to coat the parts. In some instances, the device may be used for subjecting the parts to differential temperatures.

It is an object of the present invention to provide a construction in which the conveying tracks can be more readily manufactured to provide an excellent heat transfer system and also to provide a track having parallel runs in the direction of travel which divide the parts radially along the helical track in some instances where this is desirable.

Reference is made to the Jones U.S. Patent No. 2,662,851 issued December 15, 1953, showing the basic conveying apparatus. This patent illustrates one means of heat transfer for a track by providing a false bottom in the track to create a hollow passage of generally rectangular cross-section through which heated fluid such as steam could be passed.

One objection to the false bottom construction for heat transfer lies in the fact that heat distribuion was difficult, there being areas where the heat would concentrate and other places which would remain at lower temperatures.

It is an object of the present invention to provide a track for helical conveyors which will have adequate strength to support the load it is carrying and which can present an increased surface for heat transmission, a better distribution of heat and a greater capacity for the conduction of high pressure heat exchange fluid.

Another object is the provision of a conveying track for an incremental vibratory conveyor for the purpose of conveying articles, particles, or materials through a chamber and at the same time driving off the volatile materials contained thereon or absorbed therein so that the materials can be condensed in the chamber or drawn from the chamber to another collecting force.

It is a further object to provide a track which has radial separations such that parts traveling up the path will travel in parallel helical paths, thus creating even wear on the track by preventing the concentration of parts in particular areas as will happen sometimes due to vibratory forces and which will also separate the parts radially to obtain a better result.

Briefly, these objects and others are accomplished in the embodiments shown and described in the following description and claims and accompanying drawings, the objects of the invention being accomplished by a construction wherein there is formed a plurality of passages in parallel relation along a helical path in such a manner that a heat transfer header can be applied to the grouped ends of the passages to facilitate the introduction and removal of heat exchange fluid.

In the drawings:
FIGURE 1, a vertical section of a treating tank showing the parts in assembly.
FIGURE 2, a sectional view on line 2—2 of FIGURE 1 showing the helical track.
FIGURE 3, a sectional view on line 3—3 of FIGURE 1.
FIGURE 4, a sectional view on line 4—4 of FIGURE 2.
FIGURE 5, a side view at line 5 of FIGURE 2.
FIGURE 6, a sectional view of a modified structure utilizing a polygonal cross-section for the tubes which are aligned to form the track.
FIGURE 7, a view of a modified construction showing a plurality of passages in a composite track construction.
FIGURE 8, a sectional view on line 8—8 of FIGURE 7.
FIGURE 9, a plan view of a modified section of track showing another embodiment.
FIGURE 10, a sectional view on line 10—10 of FIGURE 9.
FIGURE 11, a sectional view on line 11—11 of FIGURE 9.

Referring to the drawings:
An enclosure tank 10 has a top 12 and a bottom 14. Mounted on a suitable bracket plate 16 at the top of the tank is a helical vibratory mechanism 18 which suspends a mounting plate 20. The plate 20 supports a helical track indicated generally at 22, this support being usually accomplished by a central hollow column or cylinder 24 and vertical stanchions 26 spaced around the track. The incremental vibratory mechanism can be used for moving particles either up or down the track and thus the inlet and the outlet may be either at the top or bottom depending on the direction. In the particular device illustrated, the bottom of the track has an inlet 28 receiving parts to be treated from a conveyor belt 30 outside tank 10 which discharges into an entrance chute 32. The track has a tangential exit run 34 at the top which dumps on to an outlet conveyor belt 36. In many cases where volatile solvents are used, a condenser coil 38 is provided to create a condensing zone above the liquid in the tank. The pipe 40 can be used for flushing the parts as they enter and also for directing a coating material if this is desired.

The construction of the track is shown best in FIGURES 2 and 3 where it will be seen that a plurality of helical coils of tubes 42, circular in cross-section, are arranged in parallel relation side-by-side and contiguously to create a track which extends helically around the center column 24. The tubes may be spot welded together at spaced points and supported by gusseted brackets 44 which are preferably provided about every 90° around the center column. The brackets can be fastened to the vertical stanchions 26 to rigidify the structure. The tubes are preferably clamped or spot welded to the brackets 44 and a retaining rim in the form of an upstanding flange 46 is provided around the outside of the track (see FIGURE 3).

The parallel tubes are terminated at the top and bottom at a radial line and connected at this point to a header. As shown in FIGURE 2, a flexible inlet pipe 50 connects to the top ends of the tubes 42 and a flexible outlet pipe 60 connects to the bottom end of the tubes. A square manifold tube 62 is connected to the pipes 50 and 60 and also is arranged in sealing engagement with the banked ends of the tubes 42. The lead-in track 28 with a side guard wall 64 is mounted flush with the top of the manifold 62, FIGURE 4, which again is flush with the top 66 of the tubes 42.

As shown in FIGURE 3, the top surface of the composite track formed by the tubes will have an undulating configuration in cross-section which will provide a series of helical grooves of furrows along the track. This tends to guide the parts in a plurality of helical paths up the helix and also increases the surface areas which can transmit heat from the fluid in the tubes to the area just above the track.

With the arrangement shown, extremely high pressures can be utilized in the tubes with an effective overall capacity and a relatively light track construction which in itself has adequate supporting strength and advantageous surface from the point of view of conveying and heat exchange.

While it is known that a circular cross-section is best designed for the resistance to high internal pressure, nevertheless, for certain constructions, the device shown in FIGURE 6 can be utilized wherein tubes 80 of square cross-section are welded at the corners en banc and support in the usual manner as described in connection with FIGURES 1 to 5. This construction also provides, as will be seen, a large surface area for contact with the parts being handled and the serrated surface, shown in cross-section, accentuates the tracking or grooving surface in a manner to keep the material distributed radially for better drying conditions. Various tube designs can be used to adapt to the particular materials being handled. For example, a copper steel tube can be used of the type which is wrapped into a three-layer wall of a bi-metal tubing material may be used wherein two tubes are drawn together into a mechanical interlock to provide a double wall, the inner tube being of different material than the outer tube to adapt to different corrosion and abrasion resistant problems which will be encountered with the various materials being handled.

Referring to FIGURE 7, a modification is shown wherein a track is formed of two sheets of material supported on the basic central column 24, one top sheet 78 forming the top surface having a plurality of helical ridges 80 formed therein of generally semi-circular cross-section, creating, with a bottom sheet 82, helical passages 84 which extend in parallel relationship around the track. The top sheet 78 is welded at 86 to the central column 24 and has an angled flange 88 at the outer edge to serve as a retaining wall. The bottom sheet 82 is seam welded at 90 on the inner edge and at 92 at the outer edge to seal the space between the sheets and the sheets are further joined together by intermittent spaced spot welding on the flat areas 94 between the annular passages 84.

A lead-in pipe 96 is manifolded to the bottom end of the passages 84 and the top end of the passages is manifolded into an outlet passage 98 (FIGURE 7), the discharge chute for the track being shown at 100.

In FIGURE 10, a further modification is shown wherein the central column 24 supports a flat sheet 110, to the bottom surface of which is joined a sheet 112 having helical ridges 114 spaced by flat portions 116. The outer edge of sheet 112 is seam welded at 118 to the bottom surface of sheet 110 and the inner edge is seam welded at 120, thus isolating and sealing passages 122 formed between the ridges 114 and the plate 110. Also on the top surface of the plate 110 is a third plate 130 having an outer upturned flange 132 to provide a retaining wall, the sheet 130 being provided between its inner and outer edges with segmentally-shaped fins 134 struck upwardly a slight distance at the forward edge to create radially extending abutments 136 transverse to the path of travel. These fins have the advantage of kicking parts forward at a greater rate than is normally obtained on a completely flat surface and thus insure positive clearing of the track. In some instances where different parts are used successively on the machine, this clearing is extremely important to prevent mixing of parts.

The embodiments shown in FIGURES 7 to 11 also create the concentric tubular configurations and evenly distribute heat transfer throughout the entire radial width of the track, at the same time rigidifying the track for strength and providing, as in the case of FIGURE 8, the radially divided track which carries parts in parallel rows up the inclined spiral path.

What is claimed as new is:

1. In a helical conveyor of the type utilizing a helical track disposed around a vertical axis and mounted for vibratory motion to effect incremental movement of material on said track, that improvement in a track comprising:
    (a) means forming a plurality of closed helical passages disposed substantially horizontally and adjacent each other in cross-section and extending helically in substantially parallel relation with progressively increasing helical diameters around a vertical axis, said means serving as a supporting track for material to be conveyed and as a heat exchange unit for said material, and
    (b) connections at each end of said track to manifold said passages to facilitate inlet and outlet of a heat exchange fluid to said passages.

2. A helical conveyor as defined in claim 1 in which said passages in said means create a carrying surface which is undulating in cross-section to provide a plurality of ridges and valleys extending in parallel along the track to cause radial separation of material passing along said track.

3. A helical conveyor as defined in claim 1 in which said means is composed of a plurality of parallel, helical tubes lying in contiguous relation over a plurality of helical turns around a common vertical axis, and means to hold said tubes in contiguous relation.

4. A helical conveyor as defined in claim 1 in which said means is composed of a plurality of parallel, helical tubes shaped to form, when contiguously disposed in side-by-side relation, a carrying surface of undulating cross-section to provide a plurality of ridges and valleys extending in parallel along the track.

5. A helical conveyor as defined in claim 1 in which said means is composed of a first sheet of material shaped to have a plurality of grooves formed therein extending lengthwise of the sheet, and a second sheet positioned adjacent said first sheet to close said grooves to form passages spaced laterally of said sheets and extending lengthwise of said sheets.

6. A helical conveyor as defined in claim 5 in which a supporting cylinder is disposed centrally of said track and one of said sheets is supported at its inner edge by a cylindrical wall of said cylinder, and retaining means extending along the outer edge of one of said sheets to confine material on said track.

7. In a helical conveyor of the type utilizing incremental motion from vibratory impulses, a relatively light and strong conveying track comprising:
    (a) a plate disposed in helical form around a vertical axis, said plate having a plurality of helical ridges formed therein spaced in cross-section from the inner to the outer edge of said plate to form an undulating surface in cross-section,
    (b) means supporting said plate, and
    (c) means disposed along said plate on the opposite sides of said ridges to enclose the space below said ridges to form parallel helical passages, and
    (d) fluid conducting means at each end of said plate to manifold the ends of said passages to permit the flow of a heat exchange fluid through said passages to affect the temperature of material passing along said track.

8. In a degreasing apparatus of the type utilizing incremental vibratory motion for the conveying of parts and particles along a track from one vertical level to another,
(a) a container, a vibratory track for continuously moving said particles along the track,
(b) means associated with said container for supporting said track for incremental vibratory motion,
(c) said track means comprising a plurality of parallel, helical continuous tubes shaped and arranged to lie adjacent each other in contiguous relation over a plurality of helical turns around a common axis, whereby the upper outside surfaces of said tubes serve as a supporting surface for conveying parts,
(d) means to hold said tubes in contiguous relation,
(e) fluid conducting means at each end of said tubes to manifold said ends to permit flow of a heat exchange fluid through said tubes to drive off volatiles from articles passing along said track, and
(f) a condenser within said container for acting upon said volatiles to permit re-use thereof.

References Cited by the Examiner
UNITED STATES PATENTS 2,805,841  9/1957  Kyle _____ 165—92
3,114,448  12/1963  Boris _____ 198—220 X

FOREIGN PATENTS 715,863  9/1954  Great Britain.

WILLIAM F. O'DEA, *Primary Examiner.*

C. R. REMKE, *Assistant Examiner.*